United States Patent
Okamura

(10) Patent No.: US 7,868,567 B2
(45) Date of Patent: Jan. 11, 2011

(54) BOOSTER CONVERTER CIRCUIT FOR VEHICLES

(75) Inventor: Masaki Okamura, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 182 days.

(21) Appl. No.: 12/272,917

(22) Filed: Nov. 18, 2008

(65) Prior Publication Data
US 2009/0146588 A1    Jun. 11, 2009

(30) Foreign Application Priority Data
Dec. 6, 2007    (JP)    ............... 2007-315386

(51) Int. Cl.
*H02P 3/00*    (2006.01)
(52) U.S. Cl. .................. 318/139; 318/300; 318/564; 318/800
(58) Field of Classification Search ........ 318/139, 318/300, 564, 800
See application file for complete search history.

(56) References Cited

U.S. PATENT DOCUMENTS

| | | | | |
|---|---|---|---|---|
| 5,675,699 A | * | 10/1997 | Yamamoto et al. ......... | 388/811 |
| 5,764,009 A | * | 6/1998 | Fukaya et al. ............. | 318/300 |
| 7,002,313 B2 | * | 2/2006 | Kawada ..................... | 318/564 |
| 2004/0189221 A1 | * | 9/2004 | Kurosawa et al. .......... | 318/254 |
| 2005/0067999 A1 | * | 3/2005 | Okamura et al. ........... | 318/800 |
| 2007/0029954 A1 | * | 2/2007 | Okamura et al. ........... | 318/139 |

FOREIGN PATENT DOCUMENTS

| | | |
|---|---|---|
| JP | 7-87744 A | 3/1995 |
| JP | 2004-112904 A | 4/2004 |
| JP | 2006-115635 A | 4/2006 |
| JP | 2007-166875 A | 6/2007 |

* cited by examiner

*Primary Examiner*—Walter Benson
*Assistant Examiner*—Kawing Chan
(74) *Attorney, Agent, or Firm*—Kenyon & Kenyon LLP

(57) ABSTRACT

An object of the invention is to limit a current flowing in a booster converter circuit for a vehicle within a predetermined range. In the booster converter circuit for a vehicle including a battery that outputs a DC voltage; a switching unit having a switching element to be controlled to ON or OFF; an inductive element unit being connected between the battery and the switching unit and including an inductive element; a switching control unit that controls the switching element, an output voltage measuring unit that measures an output voltage of the booster converter circuit for a vehicle is provided, and the duty ratio determining device obtains a control duty ratio with respect to the switching element on the basis of a measured output voltage value so that a value of a converter current flowing through a path from the battery to the switching unit falls within a predetermined range.

8 Claims, 7 Drawing Sheets

BOOSTER CONVERTER CIRCUIT FOR VEHICLES

CROSS-REFERENCE TO RELATED APPLICATIONS

This application claims priority to Japanese Patent Application No. 2007-315386 filed on Dec. 6, 2007, which is incorporated herein by reference in its entirety.

BACKGROUND OF THE INVENTION

1. Field of the Invention

The present invention relates to a booster converter circuit for a vehicle which causes an inductive element to generate an induced electromotive force by switching control, to output a voltage including the induced electromotive force added to an output voltage of a battery.

2. Description of the Related Art

Motor-driven vehicles such as electric cars, hybrid cars, and the like are widely used. A motor of the motor-driven vehicle is rotated by electrical power supplied from a battery and drives wheels. An adjustable speed control of the motor-driven vehicle is achieved by adjusting electrical power to be supplied to the motor according to an operation of an accelerator, a brake, or the like. Therefore, a booster converter circuit for adjusting electric power to be supplied from the battery to the motor is mounted on the motor-driven vehicle.

The booster converter circuit includes an inductor for boosting the battery voltage. The booster converter circuit causes the inductor to generate the induced electromotive force by switching-controlling a current flowing from the battery to the inductor, and charges an output capacitor at a voltage including the induced electromotive force added to the battery voltage. Then, an inter-terminal voltage of the output capacitor is outputted as a boosted voltage. The boosted voltage is adjustable by changing the timing of switching the current flowing to the inductor.

A motor is connected to the output terminal of the booster converter circuit via an inverter circuit which converts a DC voltage to an AC voltage. In this configuration, electrical power supplied from the battery to the motor can be adjusted by adjusting the boosted voltage of the booster converter circuit.

A control unit which controls the booster converter circuit determines a target boosted voltage on the basis of a driving operation. Then, the switching timing of the current flowing in the inductor is adjusted so that the boosted voltage approaches a target boosted voltage. The motor is rotated by electrical power controlled in this manner and drives wheels. Accordingly, the adjustable speed control of the motor-driven vehicle on the basis of the driving operation is achieved (see JP-A-2006-115635, JP-A-2007-166875, and JP-A-2004-112904).

The boosted voltage approaches the target boosted voltage and the charging and discharging current of the output capacitor is reduced under the control of the control unit. Accordingly, a current flowing in the booster converter circuit is reduced according to the charging and discharging of the output capacitor.

When a load on the wheels is changed, a current flowing in the motor is changed. Under such conditions as well, the control unit controls the booster converter circuit so that the boosted voltage approaches the target boosted voltage. Accordingly, a current according to the charging and discharging of the output capacitor flows in the booster converter circuit.

Therefore, when the current flowing in the motor is suddenly changed due to sudden variations of the load caused by slipping of the wheels or the like, a large current flows in the booster converter circuit. Therefore, there is a problem that it is necessary to provide the booster converter circuit with a component whose allowable current value is high by taking increase in current due to the load variations into consideration, so that the manufacturing cost of the booster converter circuit is increased.

SUMMARY OF THE INVENTION

In view of such a problem, it is an object of the invention to limit a current flowing in a booster converter circuit for a vehicle within a predetermined range.

The invention provides a booster converter circuit for a vehicle including: a battery that outputs a DC voltage; a switching unit having a switching element to be controlled to ON or OFF; an inductive element unit being connected between the battery and the switching unit and including an inductive element; a switching control unit that controls the switching element, the switching control unit having a duty ratio determining device that obtains a duty ratio when controlling the switching element and a switching element controlling device that controls the switching element at the duty ratio obtained by the duty ratio determining device, causing the inductive element to generate an induced electromotive force by the control of the switching element, outputting a voltage based on the induced electromotive force and an output voltage of the battery, and supplying electrical power to a motor for driving a vehicle using the outputted voltage, in which an output voltage measuring unit that measures an output voltage of the booster converter circuit for a vehicle is provided, and the duty ratio determining device obtains a duty ratio on the basis of a measured output voltage value so that the value of a converter current flowing through a path from the battery to the switching unit falls within a predetermined range.

Preferably, a current measuring unit that measures the converter current is provided, and the duty ratio determining device includes a duty ratio calculating device that obtains a new duty ratio on the basis of a duty ratio obtained previously and the measured output voltage value at the time when the duty ratio obtained previously was obtained when a measured converter current value at the time of obtaining a new duty ratio exceeds a predetermined current threshold.

Preferably, the duty ratio determining device includes an increase estimating device that obtains an estimated increase value of the converter current on the basis of a control state of the switching element, an allowable current increase value calculating device that obtains an allowable current increase value by subtracting a value of the converter current at the time of controlling the switching element on the basis of the duty ratio obtained previously from a predetermined current threshold, and a duty ratio calculating device that obtains a new duty ratio when the estimated increase value exceeds the allowable increase value on the basis of the duty ratio obtained previously, the measured output voltage value, and the allowable current increase value.

Preferably, the allowable current increase value calculating device obtains the allowable current increase value by calculating a value of the converter current on the basis of the output voltage of the battery, the duty ratio obtained previously, and the measured output voltage value, and subtracting the calculated value of the converter current from the predetermined current threshold.

Preferably, a current measuring unit that measures the converter current is provided, and the allowable current increase value calculating device obtains the allowable current increase value by subtracting a measured converter current value at the time when the switching element is controlled on the basis of the duty ratio obtained previously from the predetermined current threshold.

Preferably, the switching element controlling device includes a duty ratio correcting and controlling device that obtains a current difference value indicating the difference between the value of the converter current and a target current control value and correcting and controlling the new value of the duty ratio on the basis of the current difference value so that the value of the converter current approaches the target current control value, and the switching element is controlled at the corrected and controlled duty ratio.

Preferably, one end of the inductive element is connected to one of the terminals of the battery, the switching unit includes a first switching element having one terminal connected to the other end of the inductive element and the other terminal connected to the other terminal of the battery, a second switching element having one terminals thereof connected to the other end of the inductive element, and an output capacitor to be connected between the other terminal of the second switching element and the other terminal of the battery, the converter current is a current flowing in the inductive element, the switching control unit controls the first and second switching elements, and the booster converter circuit for a vehicle outputs an inter-terminal voltage of the output capacitor as the output voltage.

According to the invention, the current flowing in the booster converter circuit for a vehicle can be limited within the predetermined range.

BRIEF DESCRIPTION OF THE DRAWINGS

DESCRIPTION OF THE PREFERRED EMBODIMENTS (1) Configuration of Motor-Driven Vehicle and Travel Control FIG. 1 shows a configuration of a motor-driven vehicle according to an embodiment of the invention. The motor-driven vehicle rotates a motor 16 on the basis of electrical power supplied from a battery 10, and travels by a drive force of the motor 16. An adjustable speed control of the motor-driven vehicle is achieved by adjusting electrical power supplied from the battery 10 to the motor 16. Therefore, a booster converter circuit 12 which boosts the battery voltage and adjusts a boosted voltage is used for the motor-driven vehicle. Since the motor 16 which rotates by an AC voltage is used, an inverter circuit 14 for converting an output voltage of the booster converter circuit 12 into an AC voltage is used.

Figure 1:
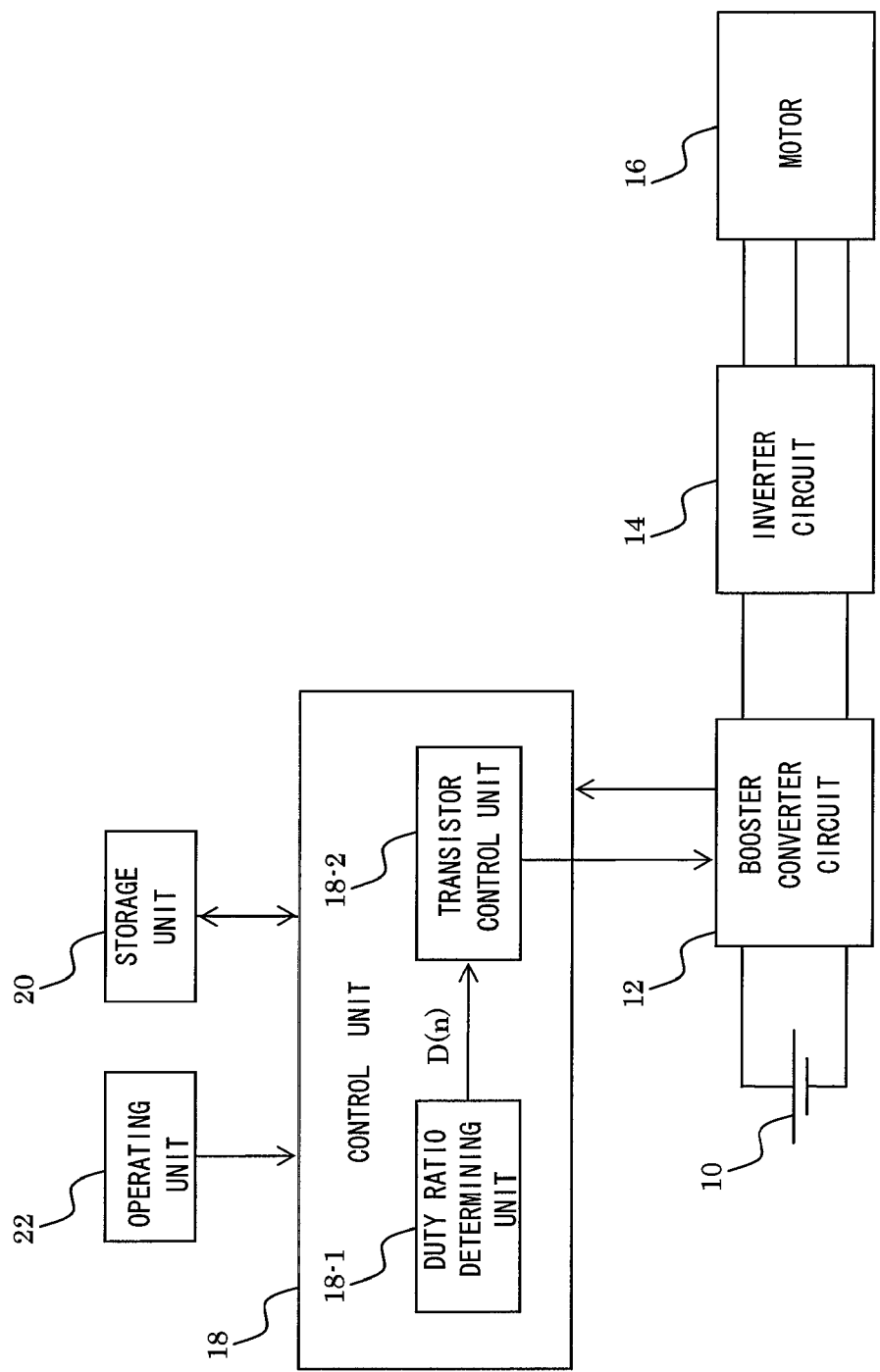
FIG. 1 is a drawing showing a configuration of a motor-driven vehicle.

The booster converter circuit 12 boosts the battery voltage on the basis of the control of a control unit 18, and outputs the same to the inverter circuit 14. The inverter circuit 14 converts the output voltage of the booster converter circuit 12 to the AC voltage and outputs the same to the motor 16. The higher the output voltage of the booster converter circuit 12 is, the larger the AC voltage that the inverter circuit 14 outputs becomes. The lower the output voltage of the booster converter circuit 12 is, the lower the AC voltage that the inverter circuit 14 outputs becomes. Therefore, the output AC voltage of the inverter circuit 14 can be adjusted by adjusting the output voltage of the booster converter circuit 12.

When the motor 16 rotates at a speed according to the output AC voltage of the inverter circuit 14, transmission of electric power is not performed between the battery 10 and the motor 16, and the motor 16 rotates at a constant speed. When the output voltage of the booster converter circuit 12 is increased in this state, the output AC voltage of the inverter circuit 14 increases, and electric power is supplied from the battery 10 to the motor 16 via the booster converter circuit 12 and the inverter circuit 14. Accordingly, the motor 16 generates an accelerating torque and hence the motor-driven vehicle is accelerated. When the output voltage of the booster converter circuit 12 is lowered, the output AC voltage of the inverter circuit 14 is lowered, and the electrical power is collected in the battery 10 from the motor 16 via the inverter circuit 14 and the booster converter circuit 12. Accordingly, the motor 16 generates a braking torque, and the motor-driven vehicle is decelerated. The deceleration of the motor-driven vehicle may also be performed by a separately provided braking mechanism instead of the braking torque of the motor 16.

An operating unit 22 includes an accelerator pedal, a brake pedal and so on, and outputs control commands according to a driving operation to the control unit 18. The control unit 18 determines a target output voltage of the booster converter circuit 12 on the basis of the control command. Then, the booster converter circuit 12 is controlled so that the difference between the output voltage and the target output voltage of the booster converter circuit 12 is reduced.

As described above, in the motor-driven vehicle, the target output voltage of the booster converter circuit 12 is determined according to the driving operation, and the booster converter circuit 12 is controlled according to the target output voltage. However, in the motor-driven vehicle in the related art, in a case where the output voltage is caused to follow the target output voltage when a current flowing in the motor 16 is varied due to the load variation, a large current flows in the booster converter circuit 12. Therefore, there arises a problem such that an electrical component whose allowable current value is high must be used in the booster converter circuit 12. Therefore, in the motor-driven vehicle according to the embodiment of the invention, the booster converter circuit 12 is controlled so that the current flowing in the booster converter circuit 12 falls within a predetermined range.

(2) Configuration and Basic Control of Booster Converter Circuit 12

Figure 2:
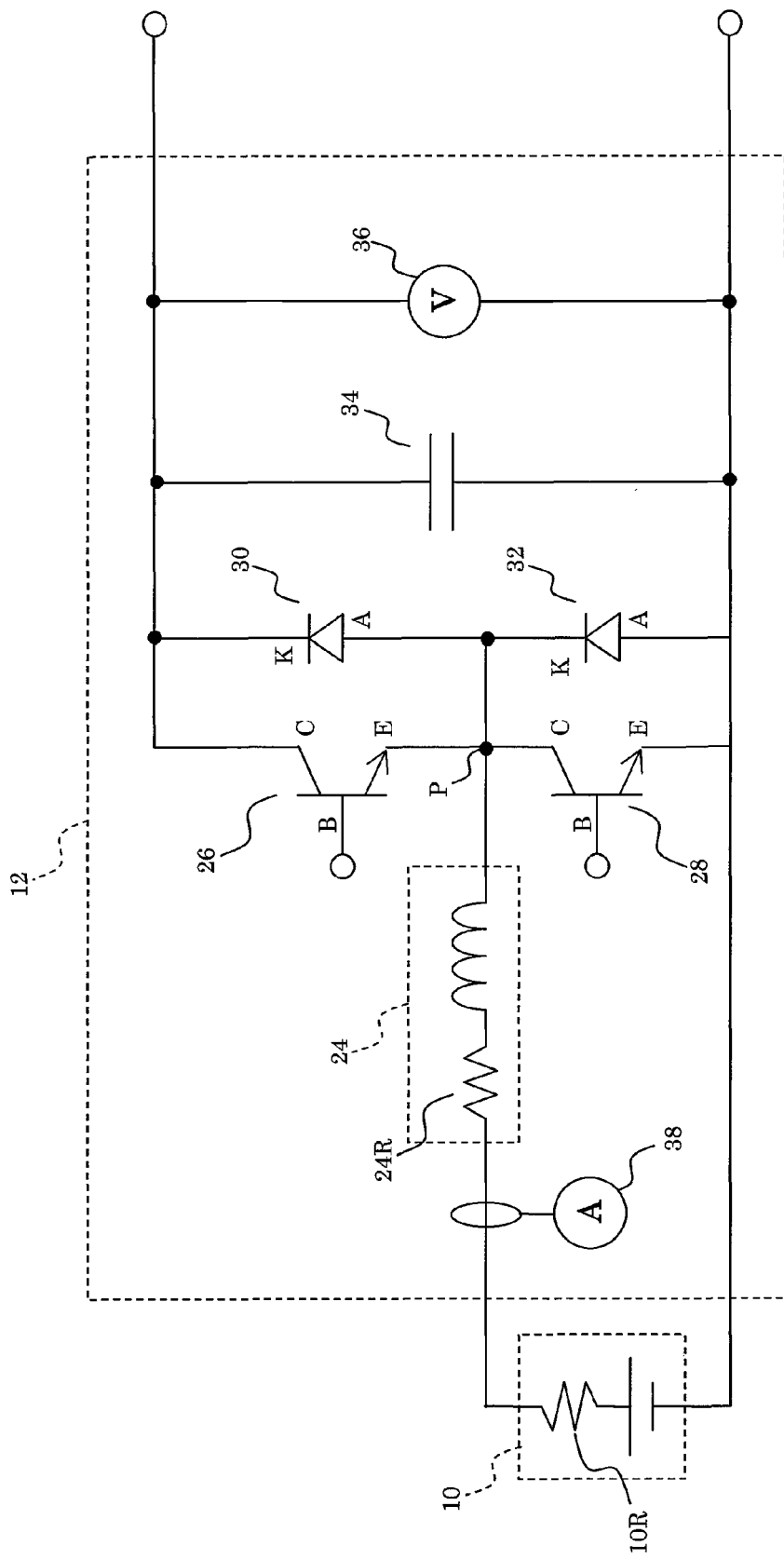
FIG. 2 is a drawing showing a configuration of a booster converter circuit.

A configuration of the booster converter circuit 12 and its basic control will be described. The configuration of the booster converter circuit 12 according to the embodiment of the invention is shown in FIG. 2. The control unit 18 controls the booster converter circuit 12 so that the difference between the target output voltage determined on the basis of the driving operation and the output voltage becomes smaller.

The control of the booster converter circuit 12 is performed by switching-controlling a converter current flowing through a path from the battery 10 to a connecting point between an upper arm transistor 26 and a lower arm transistor 28 (hereinafter, referred to as a transistor connecting point P) via an inductor 24 by the upper arm transistor 26 and the lower arm transistor 28. An IGBT (Insulated Gate Bipolar Transistor) or the like may be used as the upper arm transistor 26 and the lower arm transistor 28. The upper arm transistor 26 and the lower arm transistor 28 may be controlled to ON or OFF by changing a voltage between a base terminal B and an emitter terminal E. When the upper arm transistor 26 and the lower arm transistor 28 are ON, a current flows from a collector terminal C to the emitter terminal E.

A control of the booster converter circuit 12 which boosts the battery voltage and adjusts the magnitude thereof will be described. The control unit 18 controls the lower arm transistor 28 so as to be ON and OFF repeatedly at a predetermined duty ratio with respect to a predetermined cycle. The control unit 18 controls the upper arm transistor 26 so as to be turned OFF when the lower arm transistor 28 is ON, and to be turned ON when the lower arm transistor 28 is OFF. In order to perform such the control, the control unit 18 includes a duty ratio determining unit 18-1 which determines the duty ratio on the basis of the target output voltage or the operating state of the booster converter circuit 12 or the like, and a transistor control unit 18-2 which controls the upper arm transistor 26 and the lower arm transistor 28 on the basis of the determined duty ratio.

An end of the inductor 24 is connected to a positive polarity terminal of the battery 10. The other end of the inductor 24 is connected to the collector terminal C of the lower arm transistor 28, and the emitter terminal E of the lower arm transistor 28 is connected to a negative polarity terminal of the battery 10. Therefore, when the upper arm transistor 26 is turned OFF and the lower arm transistor 28 is turned ON, a current flows from the battery 10 to the collector terminal C of the lower arm transistor 28 via the inductor 24.

Then, when the upper arm transistor 26 is turned ON and the lower arm transistor 28 is turned OFF, the current flowing to the inductor 24 is blocked, and an induced electromotive force having a positive polarity on the side of the lower arm transistor 28 is generated in the inductor 24.

One end of the inductor 24 is connected to the positive polarity terminal of the battery 10, and the other end thereof is connected to an anode terminal A of an upper arm diode 30 and the emitter terminal E of the upper arm transistor 26. An output capacitor 34 is connected between the collector terminal C of the upper arm transistor 26 connected to a cathode terminal K of the upper arm diode 30 and the negative polarity terminal of the battery 10.

Therefore, when the battery voltage including the induced electromotive force of the inductor 24 added thereto is larger than an inter-terminal voltage of the output capacitor 34, the upper arm diode 30 is made to conduct by being applied with a voltage of a normal direction. Accordingly, the output capacitor 34 is charged by a voltage including the induced electromotive force of the inductor 24 added to the battery voltage and hence the output voltage is increased.

In contrast, when the voltage including the induced electromotive force of the inductor 24 added to the battery voltage is smaller than the inter-terminal voltage of the output capacitor 34, a discharge current flows from the output capacitor 34 to the inductor 24 via the upper arm transistor 26. Accordingly, the battery 10 is charged, and Joule heat is discharged by an internal resistor 10R of the battery 10 and an internal resistor 24R of the inductor 24. The inter-terminal voltage of the output capacitor 34 is lowered by discharge and the output voltage is correspondingly lowered.

When the voltage including the induced electromotive force of the inductor 24 added to the battery voltage is equal to the inter-terminal voltage of the output capacitor 34, the current does not flow in the upper arm diode 30 and the upper arm transistor 26, and the output voltage is maintained.

When the output capacitor 34 is in the discharging state, and the output voltage is lowered, a current directed from the upper arm transistor 26 toward the battery 10 flows in the inductor 24. In this state, when the upper arm transistor 26 is turned OFF and the lower arm transistor 28 is turned ON, a voltage in the reverse direction might be applied between the collector terminal C and the emitter terminal E of the lower arm transistor 28 by the induced electromotive force of the inductor 24. Therefore, a lower arm diode 32 is connected between the collector terminal C and the emitter terminal E of the lower arm transistor 28 so that the side of the emitter terminal E serves as the anode terminal A and the side of the collector terminal C serves as the cathode terminal K. Accordingly, when the voltage in the reverse direction is applied between the collector terminal C and the emitter terminal E of the lower arm transistor 28, the lower arm diode 32 is made to conduct by being applied with a voltage in the normal direction. It is therefore no longer necessary to use a transistor having a high voltage resistance in the lower arm transistor 28.

In this manner, the output voltage of the booster converter circuit 12 varies according to the voltage including the induced electromotive force of the inductor 24 added to the battery voltage. Therefore, the output voltage is adjusted by changing the induced electromotive force of the inductor 24. The induced electromotive force of the inductor 24 depends on the magnitude of a current flowing in the inductor 24 immediately before turning OFF of the lower arm transistor 28. The current flowing in the inductor 24 increases with time after having turned ON the lower arm transistor 28. Therefore, the booster converter circuit 12 is able to adjust the output voltage and make the output voltage close to the target output voltage by changing an upper arm duty ratio D when controlling the upper arm transistor 26 and a lower arm duty ratio $F=1-D$ when controlling the lower arm transistor 28. After the output voltage reaches the target output voltage, the voltage may be maintained.

A conductor which connects the battery 10 and the inductor 24 is provided with a current meter 38. The current meter 38 measures the converter current which flows through a path extending from the battery 10 to the transistor connecting point P via the inductor 24. The current meter 38 may be provided at any position in the path where the converter current flows as long as it can measure the converter current. An output voltage meter 36 which measures the output voltage is connected between the terminals of the output capacitor 34. The current meter 38 and the output voltage meter 36 respectively output the results of measurement to the control unit 18.

As described later, the duty ratio determining unit 18-1 of the control unit 18 determines an upper arm duty ratio on the basis of the current flowing in the inductor 24 or the output voltage therefrom. In this case, the duty ratio determining unit 18-1 uses the result of measurement of the converter current of the current meter 38 or the result of measurement of the output voltage of the output voltage meter 36.

(3) Duty Ratio Control according to First Embodiment (3-1) Current-Limiting Duty Ratio Control The current-limiting duty ratio control according to a first embodiment of the invention will be described. In the current-limiting duty ratio control, the upper arm duty ratio is determined on the basis not only of the difference between the output voltage and the target output voltage, but also of the converter current in order to avoid increase in converter current due to the load variation of the motor 16. In this embodiment, it is assumed that the duty ratio determining unit 18-1 obtains the upper arm duty ratio at a certain time interval Δ, and the upper arm duty ratio obtained when n·Δ (n is an arbitrary natural number) is elapsed from the beginning of control is expressed as D(n). The time interval for obtaining the upper arm duty ratio does not necessarily have to be constant, and may be changed according to the state of traveling of the motor-driven vehicle.

Figure 3:
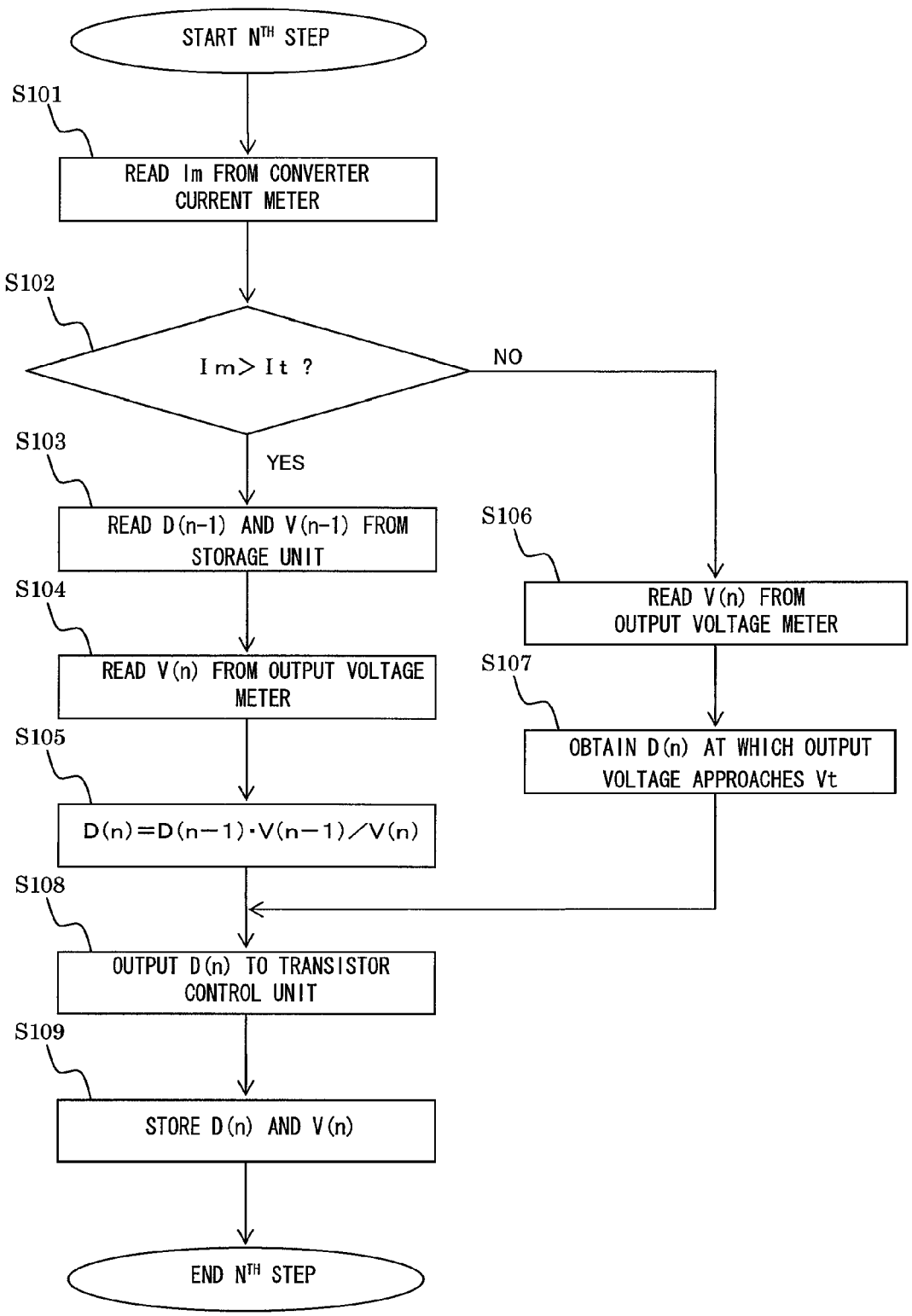
FIG. 3 is a flowchart of current-limiting duty ratio control.

FIG. 3 is a flowchart of the current-limiting duty ratio control according to the first embodiment of the invention. This flowchart shows a process which is performed in an $n^{th}$ step at the timing of n·Δ elapsed from the beginning of the control. In the current-limiting duty ratio control, the converter current is measured before obtaining a new upper arm duty ratio and, when the measured converter current value exceeds the current threshold, a new upper arm duty ratio is obtained so as not to increase the converter current.

The duty ratio determining unit 18-1 reads the measured value of the current meter 38 as a measured converter current value Im (S101). Then, the duty ratio determining unit 18-1 compares the measured converter current value Im with a predetermined current threshold It (S102).

When the measured converter current value Im is equal to or smaller than the current threshold It, the duty ratio determining unit 18-1 reads the measured value of the output voltage meter 36 as a measured output voltage value V(n) (S106). Then, the upper arm duty ratio D (n) which makes the output voltage close to a target output voltage Vt is obtained on the basis of the difference between the measured output voltage value (Vn) and the target output voltage Vt (S107). More specifically, when the measured output voltage value V(n) is smaller than the target output voltage Vt, the duty ratio determining unit 18-1 makes the upper arm duty ratio D(n) in the $n^{th}$ step a value smaller than an upper arm duty ratio D(n−1) obtained in an $n-1^{th}$ step. On the other hand, when the measured output voltage value V(n) is larger than the target output voltage Vt, the duty ratio determining unit 18-1 makes the upper arm duty ratio D(n) in the $n^{th}$ step a value larger than the upper arm duty ratio D(n−1) obtained in the $n-1^{th}$ step. In this manner, as a process of obtaining the upper arm duty ratio D(n), preferably, a feedback control process using the difference between the measured output voltage value V(n) and the target output voltage Vt as an input value and the measured output voltage value V(n) as an output value is employed.

In contrast, when the measured converter current value Im exceeds the current threshold It, the duty ratio determining unit 18-1 reads the upper arm duty ratio D (n−1) obtained in the previous $n-1^{th}$ step and a measured output voltage value V(n−1) measured in the $n-1^{th}$ step from a storage unit 20 (S103). Then, the measured value of the output voltage meter 36 is read as the measured output voltage value V(n) (S104). The upper arm duty ratio D(n) is then obtained on the basis of Expression 1 (S105). Expression 1 is an expression for obtaining the upper arm duty ratio D(n) at which the converter current is maintained in the value obtained in the $n-1^{th}$ step, and detailed description will be given later.

$$D(n)=D(n-1)\cdot V(n-1)/V(n) \quad \text{[Expression 1]}$$

In the initial step of n=1, predetermined initial values are substituted for a measured output voltage value D(0) and an upper arm duty ratio V(0) in Expression 1.

The duty ratio determining unit 18-1 outputs the upper arm duty ratio D(n) to the transistor control unit 18-2(S108). Accordingly, the transistor control unit 18-2 switching-controls the upper arm transistor 26 with the upper arm duty ratio D(n), and switching-controls the lower arm transistor 28 with a lower arm duty ratio F(n)=1−D(n) obtained corresponding to the upper arm duty ratio D(n). The transistor control unit 18-2 performs the control on the basis of the upper arm duty ratio D(n) until an upper arm duty ratio D(n+1) is outputted from the duty ratio determining unit 18-1 in a next $n+1^{th}$ step.

The duty ratio determining unit 18-1 outputs the upper arm duty ratio D(n) to the transistor control unit 18-2, and stores the measured output voltage value V (n) and the upper arm duty ratio D(n) in the storage unit 20 (S109). The stored measured output voltage value V(n) and the upper arm duty ratio D(n) are used in the next $n+1^{th}$ step.

In this process, when the measured converter current value Im is equal to or smaller than the current threshold It, the upper arm duty ratio and the lower arm duty ratio are determined so that the output voltage approaches the target output voltage value. Accordingly, the output voltage may be made close to the target output voltage, and the travel control of the motor-driven vehicle may be performed quickly according to the driving operation.

In contrast, when the measured converter current value Im exceeds the current threshold It, a new upper arm duty ratio D(n) is obtained so that D(n) V(n)=D(n−1)·V(n−1) is satisfied on the basis of Expression 1. A point in which limitation of the converter current is achieved by obtaining the upper arm duty ratio D(n) in this manner will be described.

When the potential of the transistor connecting point P with reference to the potential of the negative polarity terminal of the battery 10 is assumed to be Vp, the potential Vp of the connecting point is expressed by Expression 2 as a product of the measured output voltage value V(n) and the upper arm duty ratio D(n) of the booster converter circuit 12.

$$Vp=D(n)\cdot V(n) \quad \text{[Expression 2]}$$

Therefore, by determining the upper arm duty ratio D(n) on the basis of the Expression 1, the potential of the connecting point Vp=D(n)·V(n) is equal to D(n−1)·V(n−1), so that the previous value in the $n-1^{th}$ step is maintained.

A converter current Ip is expressed as Expression 3 using a battery voltage V0 and an added value R of the internal resistor 10R of the battery 10 and the internal resistor 24R of the inductor 24.

$$Ip=(V0-Vp)/R \quad \text{[Expression 3]}$$

Here, the battery voltage V0 is constant, and the potential Vp of the connecting point in the $n^{th}$ step is maintained at a value in the $n-1^{th}$ step. Therefore, as is understood from Expression 3, the converter current Ip in the $n^{th}$ step is maintained at a value in the $n-1^{th}$ step. Therefore, according to the control shown in FIG. 3, the converter current Ip is prevented from exceeding the value when the $n-1^{th}$ step is carried out in the steps from the $n^{th}$ step onward. Accordingly, even when the load of the motor 16 is varied due to the load variation to the wheels, increase of the converter current may be limited. Therefore, an electrical component whose allowable current value is small may be used in the booster converter circuit 12, so that the manufacturing cost may be lowered.

(3-2) Application of Current-Limiting Duty Ratio Control

Subsequently, a duty ratio feedback control according to an application of the first embodiment will be described. This control is such that the transistor control unit 18-2 performs feedback control of the upper arm duty ratio D (n) when the measured converter current value Im exceeds the current threshold It so that the converter current approaches the current threshold.

Figure 4:
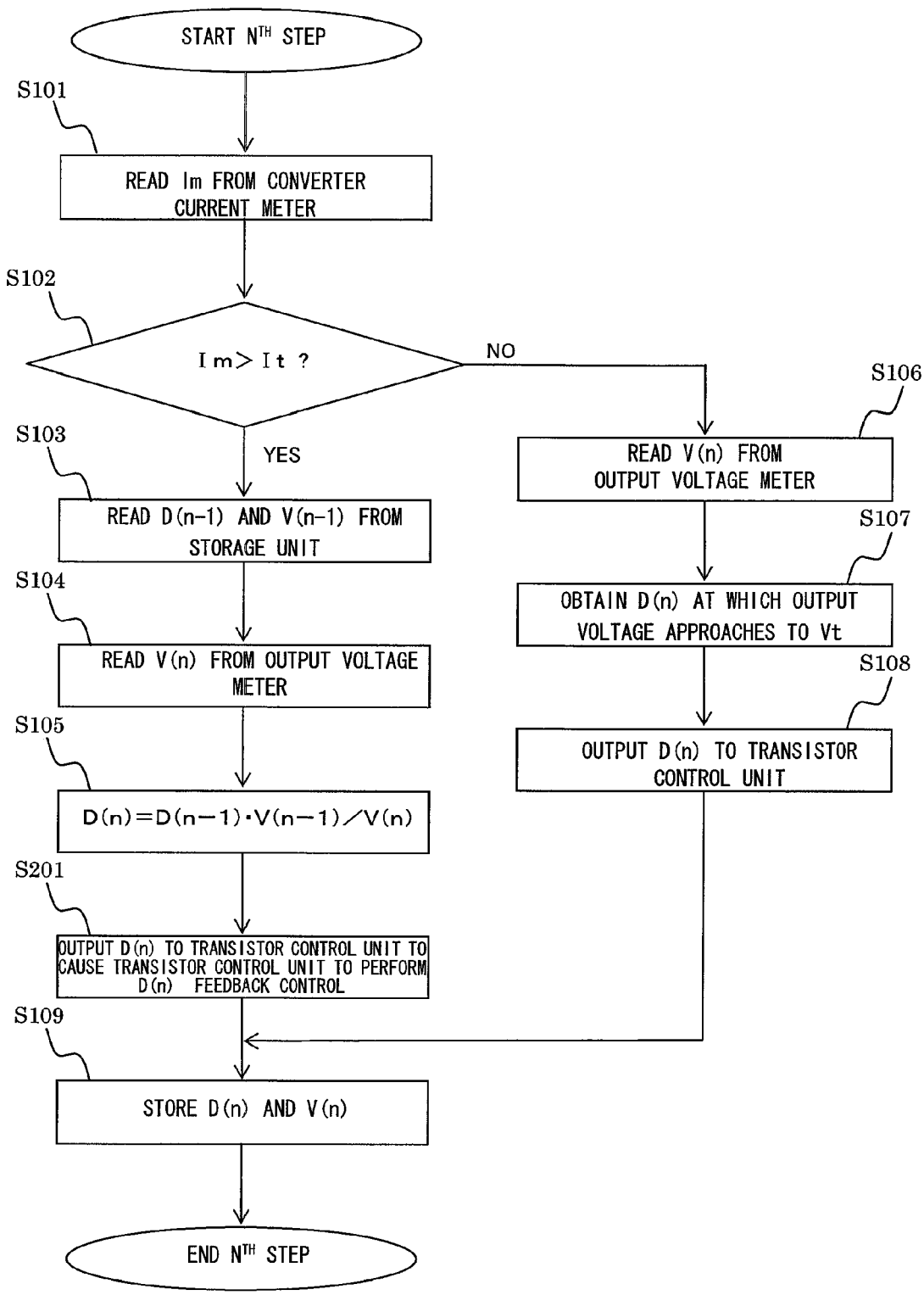
FIG. 4 is a flowchart of duty ratio feedback control according to an application of a first embodiment.

FIG. 4 shows a flowchart of the duty ratio feedback control. The same processes as those shown in FIG. 3 are designated by the same reference numerals and description thereof will be omitted.

When the measured converter current value Im is equal to or smaller than the current threshold It, the duty ratio determining unit 18-1 obtains the upper arm duty ratio D(n) according to the steps S106 to S108 and outputs the same to the transistor control unit 18-2. Then, the upper arm duty ratio D(n) and the measured output voltage value V(n) are stored in the storage unit 20 (S109).

In contrast, when the measured converter current value Im exceeds the current threshold It, the duty ratio determining unit 18-1 obtains the upper arm duty ratio D(n) according to the steps S103 to S105. Then, the duty ratio determining unit 18-1 outputs the upper arm duty ratio D (n) to the transistor control unit 18-2, and causes the transistor control unit 18-2 to perform a D(n) feedback control (S201).

Figure 5:
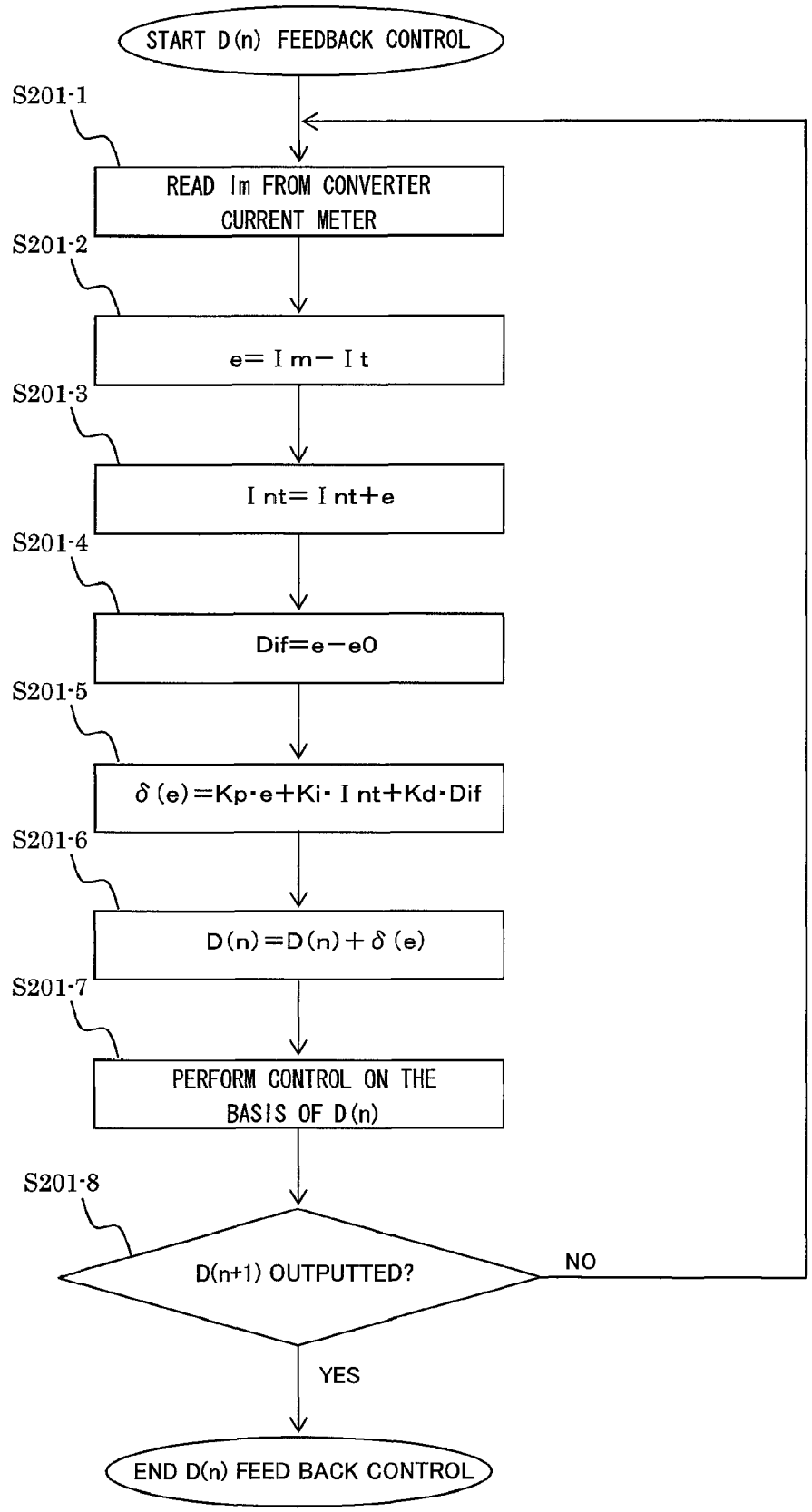
FIG. 5 is a flowchart of D(n) feedback control.

FIG. 5 shows a flowchart of the D(n) feedback control. This flowchart shows a process that the transistor control unit 18-2 performs from the time when the upper arm duty ratio D(n) is outputted from the duty ratio determining unit 18-1 until the upper arm duty ratio D(n+1) is outputted.

Then, the transistor control unit 18-2 reads the measured converter current value Im from the current meter 38 (S201-1). Then, a control error e obtained by subtracting the current threshold It from the measured converter current value Im is obtained (S201-2).

The transistor control unit 18-2 obtains a value including the control error e added to a control error integrated value Int as a new control error integrated value Int (S201-3). A control error difference value Dif obtained by subtracting a control error e0 in the feedback steps from the control error e onward is then obtained (S201-4). In the initial step of the D(n) feedback control, predetermined initial values are set for the control error integrated value Int and the control error e0.

The transistor control unit 18-2 obtains a correction value δ(e) with respect to the upper arm duty ratio D(n) on the basis of Expression 4 (S201-5).

$$\delta(e) = Kp \cdot e + Ki \cdot Int + Kd \cdot Dif \quad \text{[Expression 4]}$$

where Kp is a proportional feedback gain, Ki is an integrated feedback gain, and Kd is a differential feedback gain.

The transistor control unit 18-2 sets a value including the correction value δ(e) added to the upper arm duty ratio D(n) as a new upper arm duty ratio D(n) (S201-6). Then, the transistor control unit 18-2 switching-controls the upper arm transistor 26 with the obtained upper arm duty ratio D (n), and switching-controls the lower arm transistor 28 with a lower arm duty ratio F (n)=1−D (n) obtained corresponding to the upper arm duty ratio D (n) (S201-7).

The transistor control unit 18-2 determines whether or not the upper arm duty ratio D(n+1) in the n+1$^{th}$ step is outputted from the duty ratio determining unit 18-1 (S201-8). Then, when the upper arm duty ratio D(n+1) is not outputted, the procedure goes back to the step S201-1, where the D(n) feedback control is continued. In contrast, when the upper arm duty ratio D(n+1) is outputted, the D(n) feedback control is ended. When the D(n) feedback control is ended, the transistor control unit 18-2 starts a new D(n+1) feedback control with respect to the upper arm duty ratio D(n+1) obtained in the n+1$^{th}$ step.

The duty ratio determining unit 18-1 outputs the upper arm duty ratio D(n) to the transistor control unit 18-2 in the step S201, and causes the transistor control unit 18-2 to perform the D(n) feedback control (S201), then stores the upper arm duty ratio D(n) and the measured output voltage value V(n) in the storage unit 20 (S109), and then ends the duty ratio feedback control with respect to the n$^{th}$ step.

In the process as described above, a proportional, integral, and differential feedback control of the upper arm duty ratio D (n) to make the converter current the current threshold can be performed from the time when the upper arm duty ratio D(n) is obtained until the time when the upper arm duty ratio D(n+1) is obtained. Therefore, when the converter current exceeds the current threshold, the converter current can be reduced to the current threshold, and the converter current can be controlled so as not to exceed the current threshold. In the case where an error is contained in the measured output voltage value V(n) or there is an error between the upper arm duty ratio D(n) which is outputted by the duty ratio determining unit 18-1 and an actual control duty ratio, increase in converter current is avoided.

Here, the case where the proportional, integral, and differential feedback control is used has been described. In addition to these controls, a proportional feedback control or a proportional and integral feedback control may also be used. When the proportional and integral feedback control is used, the process of obtaining the control error differential Dif in the step S201-4 is omitted, and the third term on the right side in Expression 4 is changed to zero. When the proportional feedback control is used, the process of obtaining the control error integral value Int in the step S201-3 and the process of obtaining the control error differential Dif in the step S201-4 are omitted, and the second and third terms on the right side in Expression 4 are changed to 0.

(3-3) Rate Process

According to the current-limiting duty ratio control described above, the upper arm duty ratio is outputted from the duty ratio determining unit 18-1 to the transistor control unit 18-2 at the predetermined time intervals. The transistor control unit 18-2 is able to change the control duty ratio with respect to the upper arm transistor 26 and the lower arm transistor 28 discretely at each calculating step on the basis of upper arm duty ratio D(1), D(2), . . . , D(n), D(n+1), . . . outputted at the predetermined time intervals to control the booster converter circuit 12.

In this manner, a rate process in which the control duty ratio is advanced gradually to an upper arm duty ratio D(j+1) (j is a natural number equal to 1 or larger) outputted from a previously outputted subsequently upper arm duty ratio D(j) onward and the control duty ratio is changed continuously may be performed instead of the control in which the control duty ratio is changed with respect to the upper arm transistor 26 and the lower arm transistor 28 discretely.

When the rate process is performed, the variations in control duty ratio are smoothed, and hence reduction of the variations in converter current is achieved. Accordingly, determination is "NO" in a j+1$^{th}$ step which is the next step of a j$^{th}$ step where the determination is "Yes" in the step S102, so that variations in converter current due to release of the limit with respect to the converter current are avoided.

Figure 6:
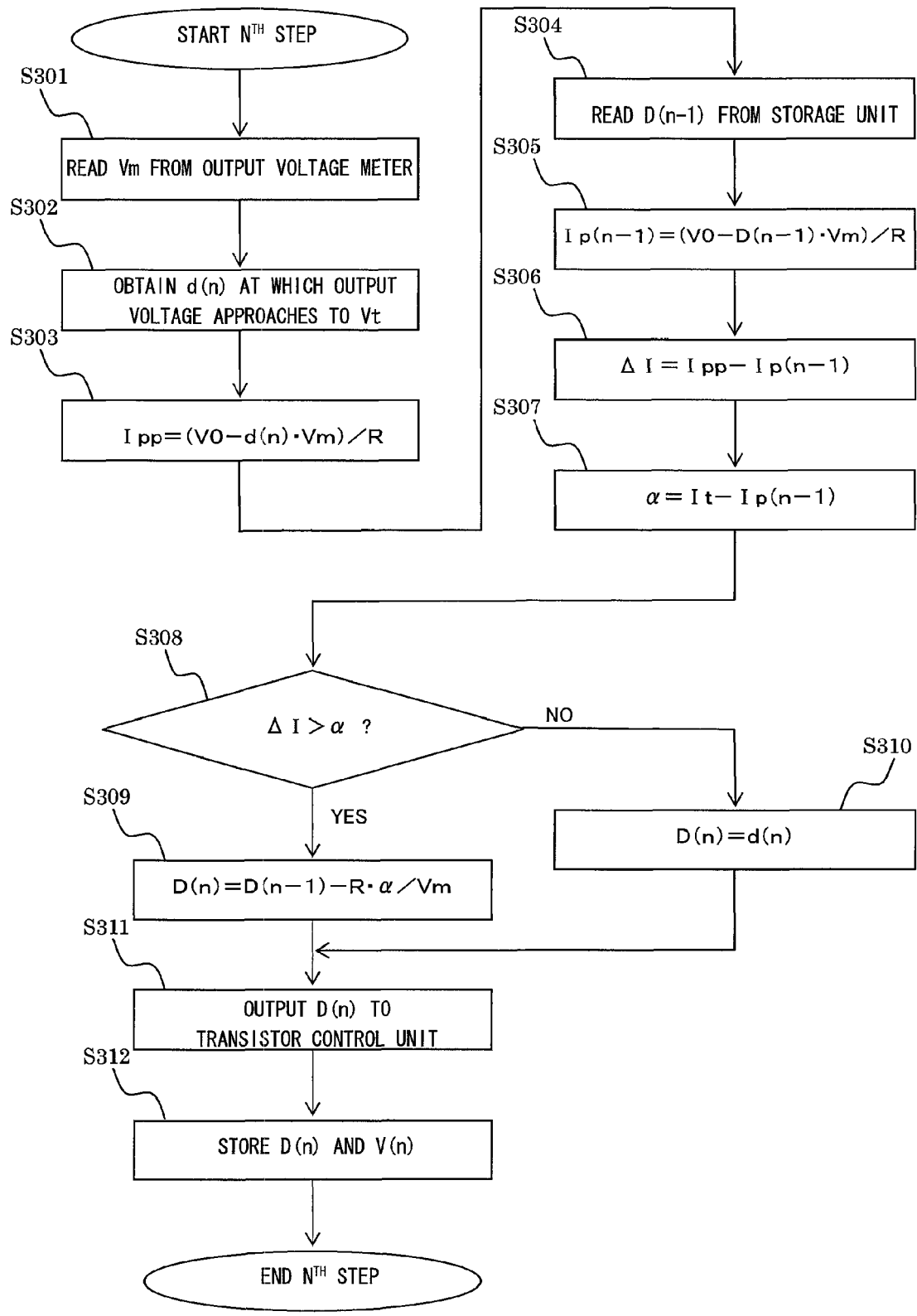
FIG. 6 is a flowchart of estimated limited duty ratio control.

(4) Duty Ratio Control according to Second Embodiment (4-1) Estimating and limiting Duty Ratio Control The estimating and limiting duty ratio control according to a second embodiment of the invention will now be described. This control process estimates an increased value of the converter current on the basis of the converter current in the previous n−1$^{th}$ step to obtain a new duty ratio D(n) at which the increase in converter current does not exceed the allowable increase value. FIG. 6 shows a flowchart of the estimating and limiting duty ratio control. This flowchart shows a process performed in the $n^{th}$ step.

The duty ratio determining unit 18-1 reads the measured value of the output voltage meter 36 as a measured output voltage value Vm (S301). Then, an upper arm provisional duty ratio d(n) which makes the output voltage close to the target output voltage Vt is obtained on the basis of the difference between the measured output voltage value Vm and the target output voltage Vt (S302). This process is the same as that in the step S107 in the flowchart in FIG. 3.

The duty ratio determining unit 18-1 obtains an estimated converter current value Ipp on the basis of Expression 5 (S303).

$$Ipp=(V0-d(n)\cdot Vm)/R \qquad \text{[Expression 5]}$$

where V0 is the battery voltage, and d(n)·Vm is an estimated potential of the transistor connecting point P in a case where the booster converter circuit 12 is controlled by the upper arm provisional duty ratio d(n), and R is an added value for the respective internal resistances of the battery 10 and the inductor 24.

Then, the duty ratio determining unit 18-1 reads the upper arm duty ratio D(n−1) obtained in the previous n−1$^{th}$ step from the storage unit 20 (S304). The duty ratio determining unit 18-1 then obtains a converter current value Ip(n−1) in the n−1$^{th}$ step on the basis of Expression 6 (S305).

$$Ip(n-1)=(V0-D(n-1)\cdot Vm)/R \qquad \text{[Expression 6]}$$

The reason why the same value can be used as the measured output voltage value Vm in Expression 5 and Expression 6 is because it can be considered that the capacitance of the output capacitor 34 is sufficiently large and the variation in output voltage between the n−1$^{th}$ step and the n$^{th}$ step is sufficiently small.

The duty ratio determining unit 18-1 obtains an estimated current increase value ΔI obtained by subtracting the converter current value Ip(n−1) from the estimated converter current value Ipp on the basis of Expression 7 (S306).

$$\Delta I=Ipp-Ip(n-1) \qquad \text{[Expression 7]}$$

The duty ratio determining unit 18-1 obtains an allowable increase value α obtained by subtracting the converter current value Ip(n−1) from the current threshold It on the basis of Expression 8 (S307).

$$\alpha=It-Ip(n-1) \qquad \text{[Expression 8]}$$

The duty ratio determining unit 18-1 compares the estimated current increase value ΔI and the allowable increase value α (S308). When the estimated current increase value ΔI exceeds the allowable increase value α, the duty ratio determining unit 18-1 obtains a new upper arm duty ratio D(n) on the basis of Expression 9 (S309). Expression 9 is an expression for determining the upper arm duty ratio D(n) at which the converter current becomes the current threshold It, and detailed description will be given later.

$$D(n)=D(n-1)-R\cdot\alpha/Vm \qquad \text{[Expression 9]}$$

In contrast, when the estimated current increase value ΔI is equal to the allowable increase value α or smaller, the upper arm provisional duty ratio d(n) is employed as a new upper arm duty ratio D(n) (S310).

The duty ratio determining unit 18-1 outputs the upper arm duty ratio D(n) to the transistor control unit 18-2 (S311). Accordingly, the transistor control unit 18-2 switching-controls the upper arm transistor 26 with the upper arm duty ratio D(n), and switching-controls the lower arm transistor 28 with a lower arm duty ratio F(n)=1−D(n) obtained corresponding to the upper arm duty ratio D(n). The transistor control unit 18-2 performs the control on the basis of the upper arm duty ratio D(n) until the upper arm duty ratio D(n+1) is outputted from the duty ratio determining unit 18-1 in the next n+1$^{th}$ step.

The duty ratio determining unit 18-1 outputs the upper arm duty ratio D(n) to the transistor control unit 18-2, and stores the measured output voltage value V(n) and the upper arm duty ratio D(n) in the storage unit 20 (S312). The stored measured output voltage value V(n) and the upper arm duty ratio D(n) are used in the next n+1$^{th}$ step.

According to the steps S301 and S302, the upper arm provisional duty ratio d (n) is obtained as a duty ratio for making the output voltage close to the target output voltage value. When the estimated current increase value ΔI which is determined on the basis of the upper arm provisional duty ratio d(n) is equal to or smaller than the allowable increase value α, the upper arm duty ratio D(n) in the n$^{th}$ step is employed as the upper arm provisional duty ratio d(n) (S308 and S310). Accordingly, the travel control of the motor-driven vehicle is achieved quickly on the basis of the driving operation.

In contrast, when the estimated current increase value ΔI exceeds the allowable increase value α, a value of the upper arm duty ratio D(n−1) in the n−1$^{th}$ step corrected by the second term on the right side of Expression 9 is obtained as the upper arm duty ratio D(n).

A point in which the converter current is limited to the current threshold It by the control using the upper arm duty ratio D (n) obtained by Expression 9 will now be described. When the upper arm duty ratio D(n) in Expression 9 is substituted for Expression 10 to obtain a converter current Ip (n), the converter current Ip (n) is obtained as Expression 11.

$$Ip(n)=(V0-D(n)\cdot Vm)/R \qquad \text{[Expression 10]}$$

$$Ip(n)=(V0-D(n-1)\cdot Vm)/R+\alpha \qquad \text{[Expression 11]}$$

The first term on the right side of Expression 11 (V0−D(n−1)·Vm)/R is equal to the converter current value Ip (n−1) from Expression 6. Therefore, the converter current Ip(n) is equal to the current threshold It as shown in Expression 12.

$$IP(n)=Ip(n-1)+\alpha=It \qquad \text{[Expression 12]}$$

Here, the relation of Expression 8 is used for the deformation from the expression in the center in Expression 12 to the right side.

Therefore, when the estimated current increase value ΔI exceeds the allowable increase value α, a new upper arm duty ratio D(n) is obtained on the basis of Expression 9, whereby the converter current when the booster converter circuit 12 is controlled using the upper arm duty ratio D(n) is limited to the current threshold It. Accordingly, even when the load of the motor 16 is varied due to the load variation to the wheels, the converter current may be limited to a value equal to or smaller than the current threshold. Therefore, an electrical component whose allowable current value is small may be used in the booster converter circuit 12, so that the manufacturing cost may be lowered.

The estimating and limiting duty ratio control is able to estimate the increased value of the converter current on the basis of the converter current in the previous n−1$^{th}$ step to obtain a new duty ratio D(n) at which the increase in converter current does not exceed the allowable increase value. Accordingly, limiting of the converter current can be performed before the converter current exceeds the current threshold.

Here, the upper arm duty ratio D(n−1) obtained in the previous n−1$^{th}$ step is read from the storage unit 20 (S304), and the converter current value Ip(n−1) in the n−1$^{th}$ step is obtained by calculation on the basis of Expression 6 (S305). In this manner, the measured value Im of the current meter 38 is read before performing the step S304 or the step S305 after having performed the step S303 to use the measured converter current value Im as the converter current value Ip(n−1) instead of obtaining the converter current value Ip(n−1) by calculation. In this case, in the step S305, $$Ip(n-1)=Im \qquad \text{[Expression 6']}$$

is used instead of Expression 6.

Also, in the step S309, Expression 9'

$$D(n)=D(n-1)-\alpha \cdot (V0-D(n-1)\cdot Vm)/(Vm \cdot Im)$$

may be used instead of Expression 9. Expression 9' may be conducted as shown below.

Expression 13 is established from Expression 6 and Expression 6'.

$$Im=(V0-D(n-1)\cdot Vm)/R \qquad \text{[Expression 13]}$$

Expression 14 is obtained by solving R in Expression 13.

$$R=(V0-D(n-1)\cdot Vm)/Im \qquad \text{[Expression 14]}$$

Expression 9' is obtained by substituting Expression 14 for Expression 9 to eliminate R. The upper arm duty ratio D(n) is obtained without using the added values R of the respective internal resistances of the battery 10 and the inductor 24 by performing the step S309 according to Expression 9'. In the same manner, Expression 5' is obtained by substituting Expression 14 for Expression 5 to eliminate R.

$$Ipp=Im \cdot (V0-d(n)\cdot Vm)/(V0-D(n-1)\cdot Vm) \qquad \text{Expression 5'}$$

Therefore, it is also possible to obtain the estimated converter current value Ipp on the basis of Expression 5' after having performed the step S305 before performing the step S306 instead of obtaining the estimated converter current value Ipp in the step S303 on the basis of Expression 5. The estimated converter current value Ipp is obtained without using the added values R of the respective internal resistances of the battery 10 and the inductor 24 by using Expression 5'. The resistance value R may be varied according to change of the environment such as variations in temperature or the like. The influence of the variable resistance value R on the result of the process is avoided by obtaining the estimated converter current value Ipp on the basis of Expression 5' and obtaining the upper arm duty ratio D(n) on the basis of Expression 9'.

(4-2) Application of Estimating and Limiting Duty Ratio Control

Figure 7:
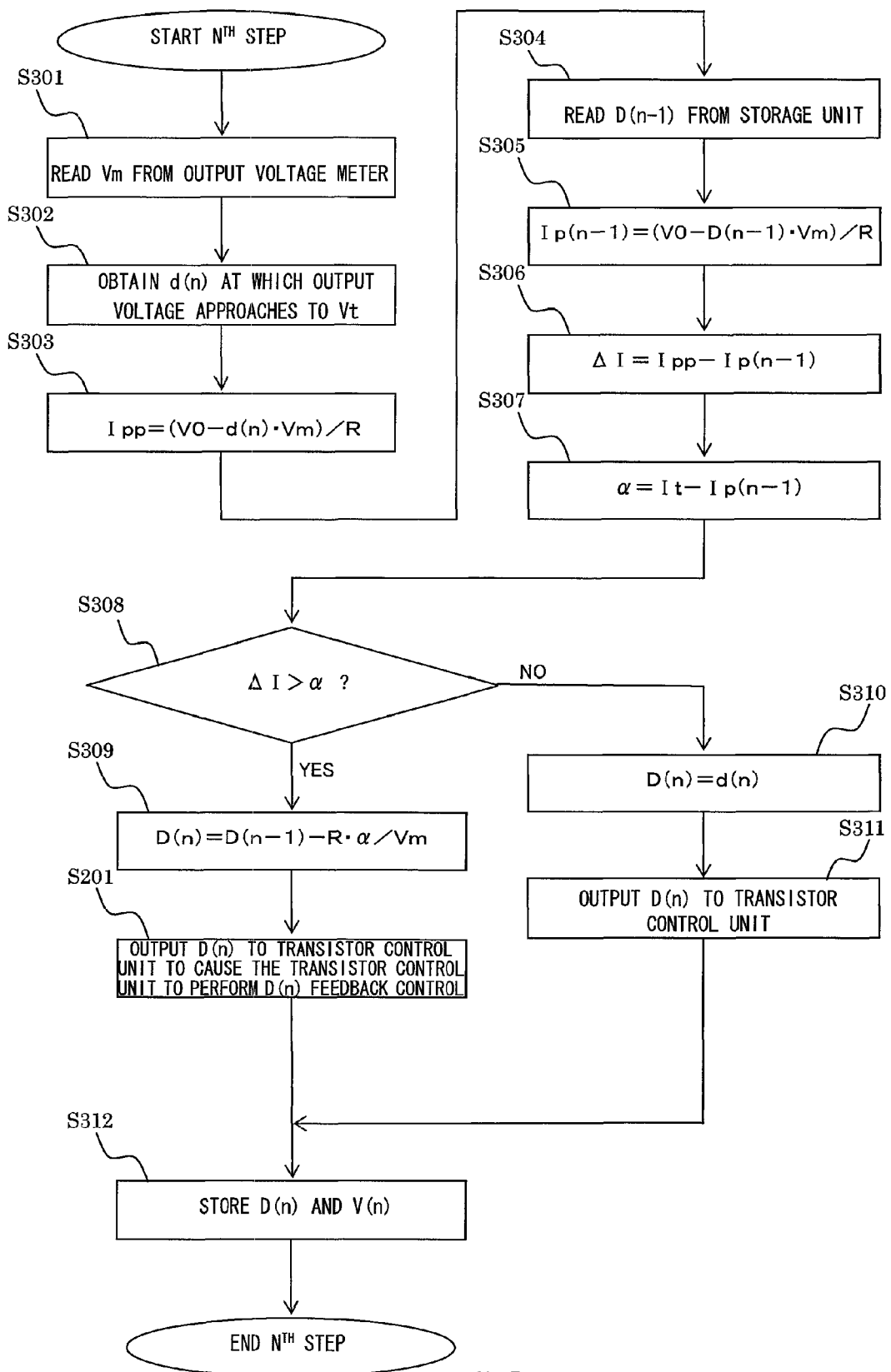
FIG. 7 is a flowchart of a duty ratio feedback control process according to an application of a second embodiment.

The D(n) feedback control shown in FIG. 5 may also be applied to the second embodiment of the invention. FIG. 7 shows a flowchart of the duty ratio feedback control according to an application of the second embodiment. The same processes as those shown in FIG. 4 and FIG. 6 are designated by the same reference numerals and description thereof will be omitted.

When the estimated current increase value ΔI is equal to or smaller than the allowable increase value α, the duty ratio determining unit 18-1 obtains the upper arm duty ratio D(n) according to the steps S310 to S311 and outputs the same to the transistor control unit 18-2. Then, the upper arm duty ratio D (n) and the measured output voltage value V(n) are stored in the storage unit 20 (S312).

In contrast, when the estimated current increase value ΔI exceeds the allowable increase value α, the upper arm duty ratio D (n) is obtained by the step S309. Then, the duty ratio determining unit 18-1 outputs the upper arm duty ratio D(n) to the transistor control unit 18-2, and causes the transistor control unit 18-2 to perform D(n) feedback control (S201). The D(n) feedback control performed by the transistor control unit 18-2 is as described on the basis of the flowchart in FIG. 5.

The duty ratio determining unit 18-1 outputs the upper arm duty ratio D(n) to the transistor control unit 18-2 in the step S201, and causes the transistor control unit 18-2 to perform the D(n) feedback control (S201), then stores the upper arm duty ratio D(n) and the measured output voltage value V(n) in the storage unit 20 (S312), and then ends the duty ratio feedback control process with respect to the n$^{th}$ step.

With this process, the same effects as in the application in the first embodiment are achieved, whereby an electrical component whose allowable current value is small may be used, so that the manufacturing cost may be lowered. Furthermore, even when the measured output voltage value V (n) includes an error or when there is an error between the upper arm duty ratio D(n) outputted by the duty ratio determining unit 18-1 and the actual control duty ratio, increase in converter current is avoided.

In the estimating and limiting duty ratio control according to the second embodiment as well, with the employment of the same rate process as described above, variations in converter current may be reduced, as in the first embodiment.

What is claimed is:

1. A booster converter circuit for a vehicle comprising:
   a battery that outputs a DC voltage;
   a switching unit having a switching element to be controlled to ON or OFF;
   an inductive element unit being connected between the battery and the switching unit and including an inductive element;
   an output voltage measuring unit that measures an output voltage of the booster converter circuit for a vehicle;
   a current measuring unit that measures a converter current flowing through a path from the battery to the switching unit; and
   a switching control unit that controls the switching element, the switching control unit including:
      a duty ratio determining device that obtains a duty ratio when controlling the switching element; and
      a switching element controlling device that controls the switching element at the duty ratio obtained by the duty ratio determining device, causing the inductive element to generate an induced electromotive force by the control of the switching element, such that the booster converter circuit outputs a voltage obtained by adding the induced electromotive force to an output voltage of the battery and supplies electrical power to a motor for driving a vehicle using the outputted voltage,
   wherein the duty ratio determining device includes a duty ratio calculating device that obtains a new duty ratio on the basis of a duty ratio obtained previously and the measured output voltage value at the time when the duty ratio obtained previously was obtained, when a measured converter current value at the time of obtaining a new duty ratio exceeds a predetermined current threshold, and
   wherein the duty ratio determining device obtains a new duty ratio so that a value of the converter current falls within a predetermined range.

2. The booster converter circuit for a vehicle according to claim 1, wherein
   the switching element controlling device includes a duty ratio correcting and controlling device that obtains a current difference value indicating the difference between the value of the converter current and a target current control value and correcting and controlling the new value of the duty ratio on the basis of the current difference value so that the value of the converter current approaches the target current control value, and the switching element is controlled at the corrected and controlled duty ratio.

3. The booster converter circuit for a vehicle according to claim 1, wherein one end of the inductive element is connected to one of the terminals of the battery, the switching unit includes a first switching element having one terminal thereof connected to the other end of the inductive element and another terminal connected to the other terminal of the battery, a second switching element having one terminal thereof connected to the other end of the inductive element, and an output capacitor to be connected between the other terminal of the second switching element and the other terminal of the battery, the converter current is a current flowing in the inductive element, the switching control unit controls the first and second switching elements, and the booster converter circuit for a vehicle outputs an inter-terminal voltage of the output capacitor as the output voltage.

4. A booster converter circuit for a vehicle comprising:

a battery that outputs a DC voltage;

a switching unit having a switching element to be controlled to ON or OFF;

an inductive element unit being connected between the battery and the switching unit and including an inductive element;

an output voltage measuring unit that measures an output voltage of the booster converter circuit for the vehicle; and a switching control unit that controls the switching element, the switching control unit including:

a duty ratio determining device that obtains a duty ratio when controlling the switching element; and a switching element controlling device that controls the switching element at the duty ratio obtained by the duty ratio determining device, causing the inductive element to generate an induced electromotive force by the control of the switching element, such that the booster converter circuit outputs a voltage obtained by adding the induced electromotive force to an output voltage of the battery and supplies electrical power to a motor for driving a vehicle using the outputted voltage, wherein the duty ratio determining device includes:

an increase estimating device that obtains an estimated increase value of a converter current flowing through a path from the battery to the switching unit, on the basis of a control state of the switching element;

an allowable current increase value calculating device that obtains an allowable current increase value by subtracting a value of the converter current at the time of controlling the switching element on the basis of the duty ratio obtained previously from a predetermined current threshold; and a duty ratio calculating device that obtains a new duty ratio when the estimated increase value exceeds the allowable increase value, on the basis of the duty ratio obtained previously, the measured output voltage value, and the allowable current increase value; and wherein the duty ratio determining device obtains a new duty ratio so that a value of the converter current falls within a predetermined range.

5. The booster converter circuit for a vehicle according to claim 4, wherein the allowable current increase value calculating device obtains the allowable current increase value by calculating a value of the converter current on the basis of the output voltage of the battery, the duty ratio obtained previously, and the measured output voltage value, and subtracting the calculated value of the converter current from the predetermined current threshold.

6. The booster converter circuit for a vehicle according to claim 4, wherein a current measuring unit that measures the converter current is provided, and the allowable current increase value calculating device obtains the allowable current increase value by subtracting a measured converter current value at the time when the switching element is controlled on the basis of the duty ratio obtained previously from the predetermined current threshold.

7. The booster converter circuit for a vehicle according to claim 4, wherein the switching element controlling device includes a duty ratio correcting and controlling device that obtains a current difference value indicating the difference between the value of the converter current and a target current control value and correcting and controlling the new value of the duty ratio on the basis of the current difference value so that the value of the converter current approaches the target current control value, and the switching element is controlled at the corrected and controlled duty ratio.

8. The booster converter circuit for a vehicle according to claim 4, wherein one end of the inductive element is connected to one of the terminals of the battery, the switching unit includes a first switching element having one terminal thereof connected to the other end of the inductive element and another terminal connected to the other terminal of the battery, a second switching element having one terminal thereof connected to the other end of the inductive element, and an output capacitor to be connected between the other terminal of the second switching element and the other terminal of the battery, the converter current is a current flowing in the inductive element, the switching control unit controls the first and second switching elements, and the booster converter circuit for a vehicle outputs an inter-terminal voltage of the output capacitor as the output voltage.

* * * * *

UNITED STATES PATENT AND TRADEMARK OFFICE
CERTIFICATE OF CORRECTION

PATENT NO. : 7,868,567 B2
APPLICATION NO. : 12/272917
DATED : January 11, 2011
INVENTOR(S) : Masaki Okamura It is certified that error appears in the above-identified patent and that said Letters Patent is hereby corrected as shown below:

| Column | Line | |
|--------|------|---|
| 13 | 9 | Change "[Expression 6]" to --[Expression 6']--. |

Signed and Sealed this
Twenty-first Day of June, 2011

David J. Kappos
*Director of the United States Patent and Trademark Office*